Patented June 18, 1935

2,005,342

UNITED STATES PATENT OFFICE 2,005,342

REFINING OF HYDROCARBONS

Leo D. Jones, Philadelphia, and Edward M. James, Moylan, Pa., assignors to The Sharples Specialty Company, Philadelphia, Pa., a corporation of Delaware No Drawing. Application March 5, 1931, Serial No. 520,466

6 Claims. (Cl. 196—40)

This invention relates to treatment of hydrocarbons with acid, such as sulphuric acid and equivalent reagents, and particularly to such treatment of hydrocarbons which have such boiling points that they are not in the form of vapor under atmospheric conditions of temperature and pressure, and which are obtained from petroleum oil and from tar derived from coal, lignite, and other carbonaceous solids.

Hydrocarbon oils are acid-treated for various purposes now well understood in the art including removal of substances that impart color and substances that render the oil unstable under the conditions encountered by the oil in storage and in use. An important purpose of acid-treating is the removal of compounds which change either spontaneously or under the influence of heat and light, such change being frequently a polymerization that produces gummy insoluble products which are likely to be carbonized under the action of heat. While acid-treatment is advantageously carried to a point that results in the substantial removal of compounds which are unsaturated to a sufficiently high degree to render them unstable, the action of the acid is selective and stability of the oil is usually accomplished without removing all of the olefines or compound deficient in hydrogen such as compounds having the general formula $C_nH_{2n-10}$. In the only practicable process heretofore suggested for acid-treatment of oils, the oil is treated in batches and undesirable changes in the oil are effected. In such processes the oil is pumped into large lead lined tanks or agitators, for example 1,500 barrels of oil are so placed in agitators having a capacity of approximately 2,000 barrels and acid is added and the mixture is violently agitated for periods varying from twenty minutes to two hours by passing large quantities of air therethrough. After such agitation the mixture is allowed to settle with a view to effecting sedimentation of the sludge that results from the action of the acid upon the oil. Ordinarily such settling requires periods varying from several hours to several days; and frequently it is necessary to repeat the treatment several times in connection with the same batch of oil in order to obtain oil of desired characteristics; and it frequently happens that the sludge particles do not agglomerate readily and may not agglomerate within several weeks, and the sludge does not settle out by gravity. In the practice of such prior processes, especially when the sludge did not settle readily, substantial percentages of water (in the neighborhood of 1% by weight of the oil in the mixture) have been added shortly before discontinuance of the agitation with a view to promoting coagulation and more rapid settling of the sludge; and even when that step is employed the settling of the sludge and its separation from the oil requires several hours and the sludge carbonizes or "cokes", and becomes very viscous before it is separated from the oil. Such sludge comprises relatively hard particles and constitutes a mass which is too viscous as a whole to permit of continuous centrifugal separation of such sludge from the oil. However, such addition of water to the oil-acid mixture causes settling of sludge in a given oil to occur more rapidly than it would occur if the water were not added. In what is considered as a successful operation of such prior practice sludge may be settled from mid-continent oil or Pennsylvania oil in twelve hours without such addition of water and settling of sludge from naphthene base oils may be effected in a similar period provided such addition of water is made.

It has heretofore been thought that when acid was agitated with oil it went at least partly into solution in the oil and upon reacting with constituents thereof formed dark substances which appeared as particles which gradually increased in size as the reaction proceeded and as a result of agglomeration, and agitation of the mixture was continued until the size of the particles was sufficient to permit of gravity settling thereof. Prior practice in accordance with the methods available and in the light of the theory of operation previously held, almost invariably resulted in injury of some kind to the oil and in losses of oil and waste of time.

We have considered with great care the effect of treating hydrocarbon oil with strong sulphuric acid. By microscopic study of oil agitated with sulphuric acid, we have found that the acid is dispersed as a discontinuous phase in the oil, that the acid particles are at first light in color and the oil is comparatively dark in color, that the color of the acid particles gradually becomes darker while the color of the continuous oil becomes lighter. It appears that during this primary action of the acid, the substances in the oil which impart color to it and which undesirably effect the stability of the oil, pass from the oil into the acid particles and are dissolved therein, such operation apparently involving a passage of such substances through the interface between the oil and the dispersed particles, the rate of such passage from the oil into the acid depending upon the size of the surface of the acid particles and therefore upon the degree of dispersion of the acid in the oil. Such primary reaction brings about the desired result, but there is a secondary reaction which is commonly referred to as a "burning" of the oil. This secondary reaction is not fully understood but we have found that it apparently involves a reaction of the acid in a dispersed particle thereof upon substances which have passed into that particle from the oil, and that such secondary reaction effects, among possible others, two undesirable results. One of these results is the evolution of sulphur dioxide gas which stays within or adheres to the particle and reduces the average specific gravity thereof and so tends to impair or prevent sedimentation of sludge of the gravity settling operation which has heretofore followed the agitation step. Another of these results is the formation of compounds which are soluble in the oil and which pass into the oil and constitute undesirable constituents which cannot be removed from the oil by any known steps. We have found that the rate at which this secondary reaction proceeds is not dependent upon the degree of dispersion of the acid in the oil. If the dispersion of the acid in the oil is substantially limited the secondary reaction may proceed as rapidly as the primary reaction and the products of the secondary reaction will be thrown back into the oil almost as rapidly as the primary reaction is, under such conditions, capable of removing from the oil the original coloring matter and unstabilizing substances therein. Regardless of the rate at which the primary reaction is made to proceed, the undesirable effects of the secondary reaction will substantially impair the quality of oil if the acid-sludge is not removed from contact with the oil promptly after the primary reaction has proceeded to the desired degree—more promptly than has heretofore been practicable. While the reaction between the acid and substances which pass from the oil into the acid, continues regardless of whether the sludge is in contact with the oil, the undesirable effects of such secondary reaction in the sludge cease when the sludge is taken out of contact with the oil that is being purified. The secondary reaction throws back into the oil products not removable by acid but having an effect on the oil similar to that of the natural constituents sought to be removed from the oil by acid-treatment, namely, similar in effect to natural constituents that impair the color and stability of the oil. It is therefore necessary in the acid-treatment of oil in accordance with prior practice, to remove from the oil more of those natural constituents of the oil which are removable by acid-treatment, to obtain an oil having a certain desired color and stability, than it would be necessary to remove if no products of the secondary reaction were thrown back into the oil. In other words, the effect of the secondary reaction in prior processes made it necessary to remove a greater percentage of the natural constituents of the oil in order to compensate for the impurities thrown back into the oil by the secondary reaction, in producing oil of a definite degree of color and stability. But, the removal of such increased quantity of constituents of the oil required the use of an increased quantity of acid and that increased the rate at which products of the secondary reaction were thrown back into the oil during the long time within which the sludge was in contact with the oil in the old settling step, and increased the quantity of sludge that entrained oil when separated.

Moreover in prior practice the unavoidably long time during which the acid-sludge was in contact with the oil made necessary the maintenance of low temperatures which in turn required extending of the time of contact between the oil and the acid-sludge especially when viscous naphthene oils and wax-containing oils were being treated.

The foregoing facts constitute but a few of the reasons why acid-treatment in accordance with prior practice has been at best a compromise in which conditions aimed toward effecting desired results have been necessarily limited and dominated by the necessity for avoiding consequent undesirable results.

An object of this invention is to provide a method for the acid-treatment of hydrocarbons which are not in vapor form under atmospheric conditions of temperature and pressure, whereby the undesirable results and effects of prior practice are minimized or eliminated and whereby acid-treatment may be better effected and more economically and more simply; and various features, advantages and objects of my invention, which may be employed separately or conjointly, will appear.

In accordance with this invention sulphuric acid, preferably having a strength in excess of 60%, advantageous results being obtained by the use of acid having a strength between 92% and 105%, is dispersed in the oil to such degree that the transfer or passage into the acid of substances to be removed from the oil occurs in such limited time that occurrence of the secondary reaction above mentioned, during the time required for the desired degree of completion of the primary reaction, is minimized or eliminated. Also, the separation of the sludge from the resulting mixture is effected so promptly and with such rapidity that occurrence of the secondary reaction while the acid-sludge is in contact with the oil is minimized or eliminated. Preferably in the practice of this invention the acid is dispersed within the oil practically to that degree of fineness which marks the limit of the finest of particles that can be removed from the oil by available steps and means with sufficient promptness to minimize the extent to which the secondary reaction can occur during the time that the acid-sludge and oil are in contact. Preferably such dispersion is effected by violently beating up the acid-oil mixture by the application of force derived from external source, the agitation being so violent that the acid is dispersed to the extent above stated. Such agitation may be effected by various known devices of which an example is the Johnson five-stage turbo-mixer. Thus in the practice of this invention, a body of mixed acid and oil comprising only a few gallons, and to which oil and acid may be continuously fed while oil-acid mixture is continuously withdrawn, may be beaten by a power-driven agitator while the flow through such body is maintained at such rate that the acid is dispersed in the oil in particles just large enough to be capable of being removed by the steps subsequently applied, including centrifugal force, within a period of time sufficiently short to prevent undesirable effects of the secondary reaction. If the oil is relatively viscous (50 seconds to 140 seconds Saybolt Universal Viscosity at 210° F.) it may be maintained at temperatures as high as 160° F. if it is a paraffine base oil, instead of having to be kept below 140° F. as in prior practice, or it may be maintained at temperatures as high as 120° F. if it is a naphthene base oil instead of having to be kept below 90° F. as in prior practice, in view of the short time during which the sludge and oil are in contact. The employment of such higher temperatures facilitates dispersion of the acid and causes a very much more rapid transfer of impurities from the oil into the acid and obviates the necessity for using diluents in connection with wax-containing oils which congeal at the lower temperatures heretofore found necessary.

In the practice of this invention the ultimate separation of the sludge from the purified oil is effected at a rapid rate and preferably promptly after completion of the primary reaction, as by passing the acid-oil mixture into a centrifuge of the type shown in Patent No. 1,232,104 to P. T. Sharples and provided with a bowl having a diameter of approximately 4" and a length of approximately 30" and rotated at speeds in the neighborhood of 15,000 R. P. M. Attempts have been made heretofore to utilize such a step in the separation of sludge from oil that has been violently agitated with acid but for various reasons such attempts have not been successful.

A further feature of this invention is that what may be termed an ageing period may be interposed between the completion of the violent agitation and the ultimate separation of the sludge from the oil. We have found that a brief ageing period, during all or part of which the mixture may or may not be mildly agitated, between the termination of the violent agitation and the separation of the sludge from the oil, facilitates completion of the primary reaction and separation of sludge from the oil. Apparently the mild agitation tends to cause dispersed sludge particles to coalesce and attain a state in which they are more readily separable from the oil. Moreover the utilization of such ageing step in which agglomeration of dispersed particles occurs, permits dispersion in the agitating step to be so intense that the dispersed acid particles are even finer than particles of the smallest size that can be practically separated immediately by high centrifugal force, since such ageing effects agglomeration of such too-fine particles into particles just large enough for removal by high centrifugal force. In the practice of this invention the separation of sludge from the mixture resulting from agitation, particularly when the mixture is aged with mild agitation for a period long enough to result in partial coalescence of the dispersed sludge particles, e. g. 4 to 20 minutes, can be effected in a centrifugal separating operation such as above described in a few seconds, e. g. 20 to 40 seconds, instead of requiring 8 hours and upwards as in prior practice. It is to be understood that the ageing period is not limited to 20 minutes but may extend to such period, of even several hours, as is necessary for the completion of the primary reaction. It thus appears that in the practice of this invention the period of contact between the acid-sludge and the oil is substantially reduced as compared with prior practice and that the extent and nature of the reactions due to such contact are capable of control whereby undesirable effects may be minimized. As a result the quantity of impurities thrown back into the oil as a result of the secondary reaction is minimized, and, therefore, in order to produce oil having the same degree of color and stability as that obtained in prior practice, it is necessary to remove only a lesser quantity of original constituents of the oil. In other words, since the final color and instability of the acid-treated oil is due to natural constituents of the original oil and to impurities resulting from the secondary reaction, the minimizing of the content of impurities due to secondary reaction by practice of this invention, makes it possible to leave in the oil more of the original natural constituents thereof while still arriving at oil that is as pure as that obtained by acid-treatment in accordance with prior practice. According to the practice of this invention less acid will be necessary. There being less acid and less solution of natural constituents of the oil there will be less sludge, and there will therefore be less loss of oil by reaction with the acid and less loss of oil by entrainment in the sludge. Moreover the centrifugal separation of oil from the sludge will reduce the proportion of oil present in and lost with such lesser quantity of sludge. Thus in the practice of this invention there is not only a lesser quantity of sludge in which a certain proportion of oil is entrained when that sludge is separated from the oil by gravity, but that proportion of oil will be reduced in view of the fact that separation is effected centrifugally.

A further and important feature of this invention is that while water added to the agitated acid-oil mixture invariably "coked" or carbonized the sludge in prior practice and brought it, prior to its separation from the oil, into a state in which it could not possibly be separated from the oil by centrifugal separation, it is nevertheless possible in the practice of this invention to add a small amount of water to the oil-acid mixture and to obtain such benefits as may result therefrom in the facilitating of the coalescence of dispersed sludge particles, provided the sludge is rapidly separated from the mixture promptly after the agitation of the water with the mixture. In prior practice the addition of water facilitated the separation of the sludge from the oil by gravity but caused the sludge to assume a condition in which it would clog the passages of a centrifugal bowl sought to be used for the separation of the sludge from the oil. In the practice of this invention the addition of water, usually in an amount smaller than that employed in prior practice, promotes the coalescence of dispersed sludge particles, possibly by affecting the nature of the interfacial tension of the particles or the electrical charge thereof, to an extent that materially facilitates the centrifugal separation of the sludge from the oil, and such cloggage of the passages of a centrifugal bowl is avoided and continuous centrifugal separation may be effectively employed, provided that the sludge is promptly after the addition of water separated from the oil at a rapid rate by means of a centrifuge. Thus in the practice of this invention an advantage is gained by the addition of water to the mixture, and, contrary to what might be expected, the continuous centrifugal separation of the sludge from the oil is not hindered by that "coking" of the sludge which previously resulted from addition of water. Such addition of water may be made prior to the discontinuance of violent agitation if no ageing period is employed, otherwise it may be made shortly prior to discontinuance of the ageing step. It is to be noted that in prior practice the use of air blowing to effect agitation resulted in carrying water into the mixture in the form of humidity in the air and that water was taken up by the acid with the result that it became diluted to a point at which it ceased to effect the intended purifying action, whereas in the practice of this invention mechanical agitation avoids such dilution of the acid. Moreover agitation by air blowing requires that the body of oil so agitated shall be large in order that such agitation shall be reasonably effective, and the handling of a large body of oil precludes the possibility of effecting sufficient agitation during a short period and precludes the possibility of prompt separation of the acid from contact with the oil. And, in prior practice the separation of sludge from the oil by settling may have produced a body of oil reasonably free of sludge, but the sludge consisted of a net-work of oil and sludge and therefore comprised a substantially large proportion of oil.

In the practice of this invention the desired or primary reactions are effected rapidly without dilution of the acid and a smaller quantity of acid will produce oil having the same color and stability as oil produced in prior practice and the amount of sludge produced will be smaller; and substantially complete separation of sludge from the oil is promptly effected, all in an operation requiring but a few minutes as compared with the hours during which oil and acid were in contact in prior practice. Consequently the desired reaction is completed and contact of oil and sludge is discontinued before the secondary reaction has introduced new impurities into the oil and before any added water has caused coking of the sludge. Another advantage in the prompt removal of the sludge is the minimizing of the formation of sulphur dioxide and the elimination of any necessity, which existed in prior practice for air blowing the oil to remove sulphur dioxide. By effecting the removal of sludge centrifugally, the separated sludge is much freer of oil than the sludge obtained by gravity settling, regardless of whether water is added to the mixture prior to such settling.

In the practice of this invention, when the same quantity of acid is used that would be used in prior processes, the resulting oil is markedly better in color and more stable against oxidation and more resistive to the action of heat than acid-treated oil produced by such prior methods; in order to produce oil having characteristics substantially equal to the characteristics of oil produced by the use of a given quantity of acid in prior processes, substantially less acid is necessary in the practice of this invention. Also, in the practice of this invention the loss of oil due to acid-treating is only 70% of the loss occurring in prior processes, when the same amount of acid is used in the practice of this invention as would be used normally in such prior processes; and if this invention is so practiced as to produce oil of the same characteristics as that produced by prior practice, e. g. if a reduced amount of acid is used in the practice of this invention, the loss of oil in the practice of this invention is only 50% of the loss of oil resulting in prior practice. Also, oils treated in accordance with this invention are less acid after the removal of sludge therefrom and require less clay or less alkali treatment.

Inasmuch as the quantity of oil under treatment is relatively small there is an extensive saving in expense for equipment as well as a considerable saving in time. It is an important feature of this invention that the treatment of oil with acid may be carried out as a continuous process, and the resulting sour oil may be passed continuously to a continuous clay contacting operation for neutralizing and decolorizing.

This invention is applicable to the treatment of all residues and distillates of petroleum and of tar regardless of whether or not such fractions have been previously dewaxed. Acid treatment in accordance with this invention may constitute a step in preparation of wax containing oil for the removal of wax therefrom and may be an extensive acid treatment leading to an oil of light color, provided the wax contained in the oil is of such nature that it may be removed after the oil has been brought to a light color, or it may be a mild acid treatment that will leave in the oil impurities commonly removable by clay treatment or strong acid treatment if the wax in the oil is of such nature that difficulty would be encountered in the continuous centrifugal removal thereof if the oil were first brought to a light color.

As an example of the practice of this invention there was treated a distillate obtained from naphthene base Texas coastal crude petroleum and having a Saybolt Universal Viscosity of 63 seconds at 210° F. a flash point of 420° F., a fire point of 480° F. and a gravity of 20.3° A. P. I. Under prior practice acid-treatment of this distillate would require the use of twelve and one-half pounds of 98% sulphuric acid per barrel of forty two gallons in order that it might be brought to a desired color and stability. In accordance with this invention it was continuously mixed in a mechanical agitator with 98% sulphuric acid in the proportion of 8 pounds of acid per barrel. The flow through the agitator was at such rate that the acid and oil were subject to violent agitation for four minutes. Then the acid-oil mixture was allowed to flow into a reaction chamber of such capacity that the oil-acid mixture remained therein for 12 minutes. The oil-acid mixture was continuously pumped into the bottom of the reaction chamber and oil overflowing the top of the reaction chamber was taken up by a second pump. Just before the acid-oil mixture entered the second pump a small percentage of water (e. g. 0.20% to 0.75% by weight of the weight of the oil in the mixture) was added to the mixture. The mixture passing from the pump was introduced immediately into a high speed continuous centrifugal separator and oil and sludge were continuously discharged separately. The oil discharged from the separator possessed characteristics as desirable as the characteristics that would be imparted to the same oil if it had been treated in accordance with prior practice with 12½ pounds of 98% sulphuric acid per barrel of oil, and the oil produced did not require air blowing and it was free of those constituents which are introduced into the oil by leaving the acid and oil in contact for a prolonged period during which secondary reaction can take place. The loss of oil resulting from the acid-treatment was only 50% of the loss that would have occurred if the oil had been brought to comparable condition by prior practice.

By treating the same oil as that treated in the foregoing example, with the proportion of acid that would be required for treating it by prior methods, namely, with 12½ pounds of 98% sulphuric acid per barrel of oil, oil was produced having a better color and being more stable against oxidation and more resistant to heat than oil produced by treating the oil in accordance with prior practice with the same quantity of acid. Moreover, the loss of oil was only 70% of the loss that would have occurred if the same oil were treated with the same quantity of acid by prior methods. For example, by treating the oil in accordance with prior practice and using 12½ pounds of acid per barrel, the loss of oil amounts to 6%, whereas by treating the oil in accordance with this invention and using 8 pounds of acid the loss of oil amounted to 2.6% and by using 12½ pounds of acid the loss amounted to 4%.

While we have described in considerable detail certain features of our invention and a specific example of the application thereof, it is to be understood that our invention is not limited to such details but includes various modifications and extensions which fall within the spirit of our invention. In this connection it is to be noted that while the shorter period of time during which the oil is in contact with the sludge in the practice of this invention permits the use of higher temperatures than have been employed heretofore and such temperatures facilitate the treatment of viscous oils, it is nevertheless within the spirit of our invention to employ a diluent for the purpose of reducing the viscosity of the oil being treated. Such a diluent may be added merely for the purpose of reducing the viscosity in order to facilitate the acid-treating or advantage may be taken of the fact that a diluent has been added to the oil to assist in the dewaxing thereof and the acid-treatment may be effected before or after such dewaxing and while the oil is diluted. Also in this connection it is to be noted that while sulphuric acid has been mentioned as the specific treating reagent, it is within the spirit of our invention to use other treating reagents such as stannous chloride or aluminum chloride or such compounds mixed with sulphuric acid. In the centrifugal separation of sludge from the treated hydrocarbon, the centrifugal force causes the formation in the bowl of an outermost layer of aqueous acid, an intermediate layer of sludge having rather indefinite specific gravity and an innermost layer of sludge-freed oil. In the centrifugal removal of sludge from acid-treated hydrocarbons it is therefore necessary that proper means be used to take care of both sludge layer and the aqueous acid layer. It has been found that this can be accomplished best by using such an adjustment of the weir which controls the discharge of the aqueous acid and sludge on the one hand and the weir which controls the discharge of the hydrocarbon on the other hand, that the column of aqueous sulphuric acid is balanced against a column of sludge and hydrocarbon. We have found the aqueous sulphuric acid layer usually has a specific gravity of about 1.70 and the relative radii of the weirs may be calculated on that basis. Satisfactory operation may be obtained from the start of the centrifugal separating step, after the relative adjustment of the weir has been determined, by priming the bowl, prior to the introduction into the bowl of mixed hydrocarbon and sludge, with aqueous acid having a specific gravity of approximately 1.70 since hydrostatic balance is thereby obtained and the contents of the bowl is in equilibrium from the very beginning of the operation. In the separating operation the non-uniformity of the proportion of aqueous acid in the mixture may require additions of aqueous acid from time to time in order to preserve the balance within the bowl. For example, if the centrifugal treatment of the sludge-oil mixture results in a separation of too small a quantity of aqueous acid to maintain proper conditions of balance within the bowl, additional aqueous acid, or even some other auxiliary liquid, having a similar specific gravity and immiscible with the sludge and hydrocarbon may be fed to the rotor in sufficient quantities to maintain balance therein, in the same manner in which carrier liquid is fed to the rotor during centrifugal dewaxing of oil. We have found that in such an operation the sludge and aqueous or auxiliary liquid may be continuously discharged together from the centrifuge while the sludge-freed hydrocarbon is separately discharged therefrom.

We claim:

1. In the refining of hydrocarbons, the steps comprising subjecting to intense agitation a mixture of a hydrocarbon and strong sulphuric acid and thereby dispersing the acid in fine particles in the hydrocarbon, discontinuing said agitation, then coalescing the fine particles by ageing the resulting mixture for a period of time between four and twenty minutes, and then immediately rapidly separating the coalesced particles from the hydrocarbon.

2. In the refining of hydrocarbon, the steps comprising subjecting to intense agitation a mixture of a hydrocarbon and strong sulphuric acid and thereby dispersing the acid in fine particles in the hydrocarbon, discontinuing said agitation, then coalescing the fine particles by ageing the resulting mixture for a period of time between four and twenty minutes while churning the same, and then immediately rapidly separating the coalesced particles from the hydrocarbon.

3. In the refining of hydrocarbons, the steps comprising dispersing strong sulphuric acid in fine particles in the hydrocarbon by intense agitation, adding water to the hydrocarbon containing the dispersed acid, and promptly after the addition of said water rapidly separating the resulting sludge from the hydrocarbon.

4. In the refining of hydrocarbons, the steps comprising dispersing strong sulphuric acid in fine particles in the hydrocarbon by intense agitation, adding water to the hydrocarbon containing the dispersed acid, and promptly after the addition of said water centrifugally separating the resulting sludge from the hydrocarbon.

5. In the refining of hydrocarbons, the steps comprising intimately dispersing sulphuric acid in hydrocarbon by mechanical agitation of such a high degree of intensity as to cause a fine degree of subdivision of the acid particles in the hydrocarbon and the formation of sludge particles of such degree of fineness as to present difficulty of commercially practicable subsidence separation, ageing the mixture for several minutes, sufficient to allow coalescence of sludge particles into larger aggregates, and finally rapidly separating sludge from oil by subsidence.

6. In the refining of hydrocarbons, the steps comprising intimately dispersing sulphuric acid in hydrocarbon by mechanical agitation of such a high degree of intensity as to cause a fine degree of subdivision of the acid particles in the hydrocarbon and the formation of sludge particles of such degree of fineness as to present difficulty of commercially practicable centrifugal subsidence separation, ageing the mixture for several minutes, sufficient to allow coalescence of sludge particles into larger aggregates, and finally rapidly separating sludge from oil by centrifugal subsidence.

LEO D. JONES.
EDWARD M. JAMES.